3,003,936
LEACHING METHOD FOR USE IN THE PRODUCTION OF ELECTROLYTIC MANGANESE
Michael C. Carosella, Niagara Falls, N.Y., assignor to Union Carbide Corporation, a corporation of New York
No Drawing. Filed Sept. 11, 1957, Ser. No. 683,231
4 Claims. (Cl. 204—105)

This invention relates to a novel leaching method for manganese-bearing slag to obtain a manganese rich feed material for the production of electrolytic manganese. More particularly, it refers to a leaching method whereby a more filterable slurry is obtained from the leaching operations.

The economic production of electrolytic manganese, as for any material requires the utilization of a readily available and, if possible, inexpensive raw material. Manganese, most generally, occurs in its natural ores with high percentages of iron and lesser amounts of other metals which require extensive, complicated methods of separation. The use of ferro-manganese as a raw material for solutions of manganese and ammonium sulfate solutions suitable for the production of pure electrolytic manganese is not economically feasible because as many methods of purification must be used with this source as with a manganese rich ore. While the electrowinning of manganese from ore is not uncommon, it requires very expensive separation methods and it is desirable to utilize some cheaper source. It has been found that manganese-bearing slag from ore furnaces, used in the production of ferro-manganese, may be controlled to contain as much as 40% manganese therein. When this slag is leached with an acidic aqueous leach solution and the slurry neutralized, all the impurities including a major portion of the iron are precipitated by the sulfide ions present in the solution and removed by filtration. The residual iron in the leach solution is precipitated by oxidation and after filtration, the solution is ready for electrolysis. For a more detailed discussion of the overall process for electrowinning manganese from manganese slag, reference is made to U.S. Patent 2,766,197 issued to M. C. Carosella. This patent sets forth an exemplary system and includes a flow sheet showing the various precipitation, oxidation and filtration steps employed to obtain a purified cell feed solution. A typical manganese slag contains 38.4% Mn, 0.34% Fe, 24.6% $SiO_2$, 19.4% $Al_2O_3$, 0.003% Cu, and 0.001% Co+Ni.

In practicing an exemplary leaching operation, as taught by this patent and generally practiced in the prior art, anolyte, make-up acid and ammonium sulfate are added to the leaching tank and an amount of slag calculated to obtain approximately 30 to 32 grams per liter of manganese in solution and a pH of 1.5 to 2.5, is added. In this prior leaching step the slag is leached at a low pH. At the end of such an acid leach, the slurry is generally a light gray in color. Considerable alumina and silica are in solution as are iron and other metallic impurities. As the pH is raised by adding ammonia, the silica and alumina precipitate and the slurry becomes increasingly thicker until it is quite viscous. At a pH of 5, the slurry begins to darken and gradually becomes black at a pH of 6.5, due to the precipitation of iron and other metallic sulfides by the sulfide ions originally present in the slag. The filtration of such a slurry and washing of the residue presents a serious problem. The weight of wet leached residue varies from 4 to 5.5 lbs. per lb. of slag treated. The large amount of ammonia necessary to neutralize this type of leach is prohibitive as it results in the undesirable build-up of ammonium sulfate in the filtered electrolyte. The use of such leaching methods, have presented considerable problems in the use of manganese-bearing slags as a source of solutions suitable for the electrowinning manganese.

It is accordingly, an object of this invention to provide an improved leaching method for manganese-bearing slags.

It is a further object to provide such a leaching method that will result in a more filterable leach slurry.

It is still a further object to provide such a leaching method which results in a less bulky, less hydrated leach residue. Other aims and advantages of the invention will be apparent from the following description and claims.

According to the teaching of this invention, there is provided an improved process for the production of cell feed solutions for the electrowinning of metallic manganese from manganese-bearing slags comprising the addition of acidic aqueous leach solution to a vessel containing a manganese-bearing slag charge at a rate whereby the pH of the leaching slurry is maintained at a value of at least 3.5. When all the solution has been added, the resulting slurry is neutralized to a pH of approximately 6.5 with ammonia or other suitable pH adjusting base.

It is to be understood that, as employed herein, the expressions, "calculated amount of manganese-bearing slag" and "calculated amounts of acidic aqueous leach solution" refer to the relative amounts of slag and solution needed to obtain the desired amount of manganese in solution at the desired pH. The usual amount of manganese desired in the solution is from 30 to 32 grams per liter and the final pH desired after the leaching step, but before neutralization with ammonia, is approximately 3.5 or higher.

In several typical operating examples of this leaching method, finely divided manganese-bearing furnace slag was used. A calculated amount of this slag necessary to obtain the desired manganese content of the solution was introduced to the leaching tank. Anolyte and make-up sulfuric acid were then added slowly to the tank so that the pH remained at 4.0 or above. After all the anolyte had been added, 2 to 4 hours of digestion time were necessary to obtain the maximum manganese extraction. Ammonia was then added to raise the pH to a value between 6.0 and 6.6. The slurry was then filtered. Data from two batches are shown in Table I. These results are representative of this type of leaching technique. By way of contrast, Table II shows the results of a leaching method, as taught by the prior art.

TABLE I
*Improved leaching technique*

| Leach No. | 1 | 2 |
|---|---|---|
| Volume, gals. | 700 | 700 |
| Slag, lbs. | 418 | 362 |
| Neutralized to pH | 6.6 | 6.1 |
| Filtration Rate, gals./ft.²/hr | 6.3 | 7.6 |
| Wet Residue, lbs. | 780 | 816 |
| Residue Moisture, percent | 65.8 | 70.8 |
| Lbs. Wet Residue/lbs. Slag | 1.9 | 2.3 |

TABLE II
*Prior art leaching technique*

| Leach No. | 3 | 4 | 5 |
|---|---|---|---|
| Volume, gals. | 800 | 700 | 1,000 |
| Slag, lbs. | 342 | 330 | 375 |
| Neutralized to pH | 6.5 | 6.5 | 6.6 |
| Filtration Rate, gals./ft.²/hr | 4.6 | 3.6 | 4.5 |
| Wet Residue, lbs. | 1,087 | 1,075 | 1,303 |
| Residue Moisture, percent | 80.0 | 73.7 | 76.1 |
| Lbs. Wet Residue/lb. Slag | 3.2 | 3.3 | 3.4 |

Consistently maintaining the pH of the leach at approximately 3.5 or above, preferably about 4.0 to 5.0, results in the simultaneous precipitation of silica and alumina forming a more granular and more filterable leach slurry. This is confirmed by comparison of the filtration rates from Tables I and II. The filtration rate, when the leaching method of the present invention is practiced, approached 7 gallons per square foot per hour, whereas the prior art leaching methods resulted in a filtration rate slightly over 4 gallons per square foot per hour. The leaching slurries produced in accordance with the method of the invention are thinner and do not have the gelatinous nature of highly acid leaches. The residue weights are lower due to less hydration and free moisture. The ratio of wet residue weight to slag weight is about 2.2 for the instant process, compared to over 3.2 where the prior art acid leaching techniques were used. Further, the leach residues of the instant process contain 10 to 12 percent less moisture; filter cakes are more compact and wash well by displacement; and the ammonium sulfate content is 5 to 7 percent which is equivalent to a loss of 0.12 to 0.14 pound per pound of manganese leached, compared to 0.15 to 0.30 pound per pound of manganese leached by known acid leaching methods.

In an alternative embodiment of the invention, an excess of the slag necessary to react with the acid in the leaching solution is added to the leach tank. This technique overcomes the problem of maintaining the pH of the leach above 3.5 when the slag and leaching solution are present in stoichiometric amounts due to the small amount of unreacted slag present toward the end of the leaching cycle. The excess slag present also speeds up the leaching cycle since the leaching solution is neutralized more rapidly. It has also been found that the silica and alumina settle more slowly than the unreacted slag, which allows good separation of the leach slurry from the slag prior to filtration.

In an operating example of this embodiment an excess slag charge was introduced into the leaching tank and the leaching solution gradually added as taught above. After neutralization of the leach, the agitation was stopped and the solids were allowed to settle. The slurry was then pumped to a filter. By this technique, a residue was left behind for the next leach which contained most of the unreacted slag and a small amount of the precipitated material. Several subsequent leaches were made wherein only enough slag to neutralize the leach solution was added. After each of these leaches a residue was left behind for the next leach. However, after several leaches the slag content of the residue became quite low. At this point the residue was leached to extract all of the manganese therein and another excess slag cycle was started. In these examples the pH remained well above 4.0 during the entire leach and the leaching cycle was naturally shortened. Table III shows the results of three excess slag leaches utilizing the novel process of this invention. The initial leach was made with 200 pounds of excess slag. Three runs were made before separate leaching of the residue was necessary.

TABLE III

*Excess slag leaching technique*

| Leach No. | 6 | 7 | 8 |
| --- | --- | --- | --- |
| Volume, gals | 700 | 700 | 700 |
| Slag, lbs | 603 | 390 | 364 |
| Neutralized to pH | 6.1 | 6.1 | 6.0 |
| Filtration Rate, gals./ft.²/hr | 6.9 | 6.9 | 8.7 |
| Wet Residue, lbs | 552 | 689 | 593 |
| Residue Moisture, percent | 63.0 | 68.0 | 64.6 |
| Lbs. Wet Residue/lbs. Slag | 1.37 | 1.76 | 1.63 |

By the leaching method of this invention, the use of such high-manganese slags as a source of manganese in the manganese electrowinning process, is made much more practicable. As stated previously, known leaching methods, while technically operable, resulted in neutralized leach slurries in which filtration was slow and the residue high in proportion to the manganese recovered as to render them commercially less attractive.

In summary, by the use of this leaching method, faster filtration rates are possible together with improved recovery of soluble values and lower wet residue weights.

It is to be understood that the foregoing description is intended by way of example only and no limitations other than those set forth in the following claims should be inferred.

What is claimed is:

1. In a process for the production of solutions suitable for employment as cell feed in the electrowinning of metallic manganese wherein a manganese-bearing slag containing substantial amounts of silica and alumina is leached with an aqueous acidic solution to provide a leach liquor high in manganese values, the leach liquor so produced is neutralized by the addition of a base, and the neutralized leach liquor is separated from the precipitates produced during the neutralization, the improvement which comprises effecting said leaching by adding said aqueous acidic solution to said manganese-bearing slag at a rate such that the pH of the resultant leach liquor is lowered to an acidic value above about 3.5 and maintained above said acidic value during such lowering, and thereafter maintaining the leach liquor at an acidic value above about 3.5 before neutralization whereby the precipitates produced during the neutralization are substantially free from gelatinous precipitated silica and alumina.

2. A process in accordance with claim 1, wherein the aqueous acidic solution is added to the manganese-bearing slag at a rate such that the pH of the resultant leach liquor is lowered to an acidic value between about 4.0 and 5.0 and maintained above said acidic value during such lowering, and thereafter maintaining the leach liquor at an acidic value between about 4.0 and 5.0 before neutralization.

3. A process in accordance with claim 2, wherein portions of the acidic leach liquor are withdrawn from the main body of leach liquor for neutralization during the course of the acid addition.

4. A process in accordance with claim 1, wherein portions of the acidic leach liquor are withdrawn from the main body of the leach liquor, for neutralization, during the course of the acid addition.

References Cited in the file of this patent

UNITED STATES PATENTS

| | | |
| --- | --- | --- |
| 2,259,418 | Hannay et al. | Oct. 14, 1941 |
| 2,334,210 | Leute | Nov. 16, 1943 |
| 2,348,742 | Mantell et al. | May 16, 1944 |
| 2,538,995 | Wanamaker et al. | Jan. 23, 1951 |
| 2,766,197 | Carosella | Oct. 9, 1956 |

FOREIGN PATENTS

| | | |
| --- | --- | --- |
| 599,796 | Great Britain | Mar. 22, 1948 |